May 7, 1957    W. B. KOLB ET AL    2,791,190
TRIPOD BAFFLE FOR FURNACES
Filed April 9, 1954
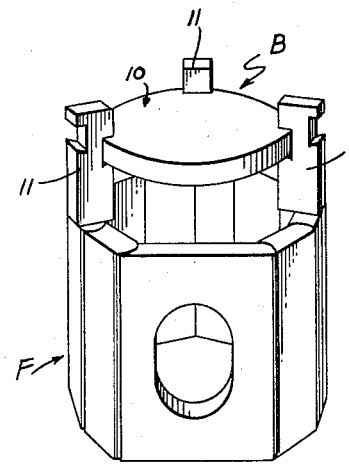
Fig. 1.
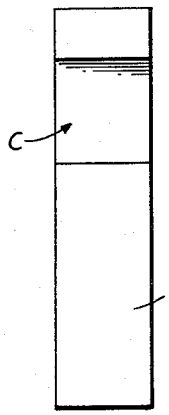
Fig. 4.
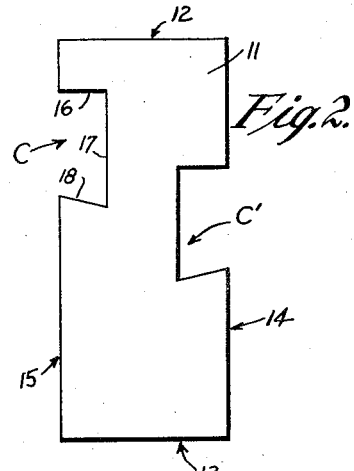
Fig. 3.
Fig. 2.
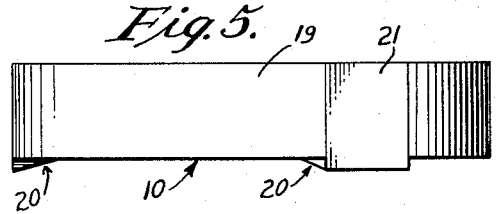
Fig. 5.
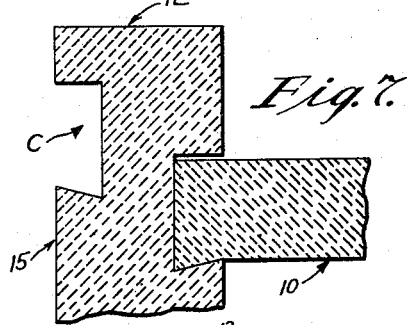
Fig. 7.
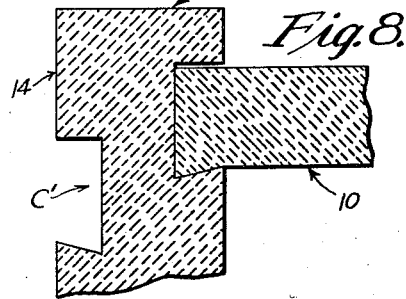
Fig. 8.
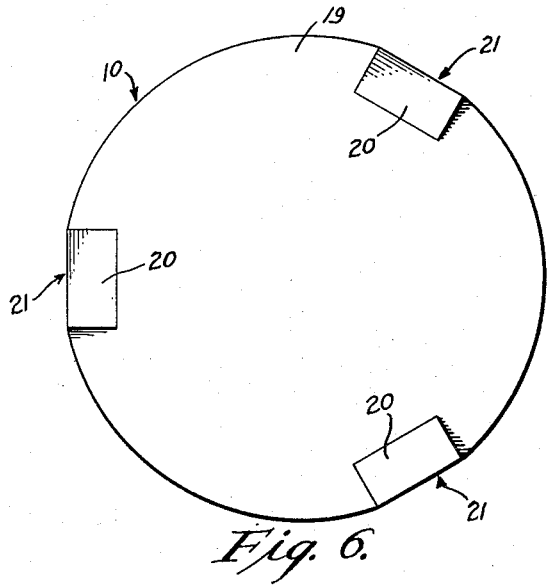
Fig. 6.
INVENTORS.
WILLIAM B. KOLB
FRANK A. BAKER
BY
THEIR ATTORNEY.

United States Patent Office 2,791,190
Patented May 7, 1957

2,791,190

TRIPOD BAFFLE FOR FURNACES

William B. Kolb, Philadelphia, and Frank A. Baker, Havertown, Pa., assignors to Kolb Refractories Company, Philadelphia, Pa., a firm composed of William B. Kolb and Milton H. Kolb Application April 9, 1954, Serial No. 422,158

4 Claims. (Cl. 110—97)

This invention relates to oil-fired combustion furnaces, and more particularly to a novel tripod baffle for use in conjunction with the combustion chamber of such a furnace.

A problem which existed early in the design of oil-fired combustion furnaces was the too rapid escape of the fuel mixture from the combustion chamber resulting in incomplete combustion of the fuel and a corresponding loss of heating efficiency.

As a solution to this problem, furnace baffles have been incorporated into the combustion chamber structure in the form of tripod baffles. These baffles commonly take the form of a circular baffle plate supported by three legs resting on top of the combustion chamber wall, and have either merely rested on top of said legs or in L-shaped cut-out sections in the legs, without the aid of any adhesive or binding agent.

This has not been entirely satisfactory, since baffles of such a structure are subject to becoming disassembled during the combustion process, inasmuch as there is no means for positively locking the baffle elements in assembled relationship.

The present invention contemplates a novel tripod baffle for oil fired combustion chambers wherein the tripod legs are provided with novel cut-out portions, and the baffle plate is provided with appendages of the same configuration as the said cut-outs, thus insuring a positive lock of the baffle and legs, in assembled relationship.

It is an object of this invention, therefore, to provide an improved tripod baffle for oil-fired combustion furnaces.

It is another object of this invention to provide a tripod baffle whose elements are locked in assembled relationship.

It is a further object of this invention to provide a tripod baffle whose elements engage in locked assembly without the use of adhesives or binding agents.

It is still a further object of this invention to provide a tripod baffle which is susceptible of easy assembly.

These and other objects are obtained by the particular elements and structure thereof shown in the accompanying drawings describing the preferred embodiment of this invention in which similar numerals refer to similar parts throughout the several views.

Figure 1 is a sketch in perspective of an oil-fired furnace combustion chamber, showing the tripod baffle of the present invention assembled thereon.

Figure 2 is a front elevational view of one of the tripod legs, showing the configuration of the cut-out portions therein.

Figure 3 is a top plan view of the tripod leg of Fig. 2.

Figure 4 is a side elevational view of the tripod leg of Fig. 2.

Figure 5 is an elevational view of the baffle plate of the invention showing the triangular appendages thereon which lock in the leg cut-out portion.

Figure 6 is a bottom plan view of the baffle plate of Fig. 5.

Figure 7 is an enlarged detail view in section with parts broken away showing the engagement of the baffle plate with one of the tripod legs.

Figure 8 is a view similar to Fig. 7, but showing the baffle plate secured in an alternate position in the tripod leg.

Referring to the drawings, the tripod baffle of this invention is referred to in its entirety in Fig 1 by the letter "B" and the furnace combustion chamber with which it is used is designated by the letter "F." As shown therein, this baffle consists of a circular baffle plate 10, and three tripod legs 11. Both the baffle plate 10 and legs 11 are preferably made from fire-clay tile.

Inasmuch as the three legs 11 are identical, description of just one of these is considered adequate for the purpose of the present disclosure. Referring to Figs. 2, 3 and 4, it will be seen that the legs 11 are of a rectangular configuration having end walls 12 and 13, and side walls 14 and 15. Near the upper end wall 12, the legs 11 are provided with a cut-out portion C in the side wall 15, the said cutout portion being defined by an upper horizontal wall 16, a vertical wall 17 extending downwardly from the horizontal wall 16 and spaced inwardly from the side wall 15, and a lower angularly disposed wall 18 extending upwardly and outwardly from the bottom-most point of the vertical wall 17. A similar cut-out portion C' is formed in the opposite side wall 14 of the leg 11, as shown in Fig. 2, but it will be noted that the cut-out portion C' is at a lower position from the end wall 12 than the cut-out C. This is to provide for a variation of the position of the baffle plate 10 relative to the combustion chamber, as will be described below.

Referring to Figs. 5 and 6, the baffle plate 10 is shown as consisting of a circular body 19 having three triangular appendages 20 on the bottom surface thereof near its periphery, the said appendages 20 being spaced 120° apart. The peripheral surface of the circular body 19 is flattended, as at 21, where the triangular appendages 20 meet said surface. This is to provide proper mating and seating of the baffle plate 10 in the cut-outs C and C' in assembly. It is to be noted that the hypotenuse of the triangular appendages 20 is equal to the length of the angular wall 18 in the cut-out portions of the leg 11.

In assemblying the tripod baffle of this invention, the baffle plate 10 is supported horizontally in any suitable manner, and the tripod legs 11 are slidably engaged therewith at the flattened area 21 of the periphery thereof, wherein the relationship between the two parts will be substantially as shown in Figs. 7 and 8.

Depending upon the rate of burning and the degree with which it is desired to retard the escape of gases from the furnace combustion chamber, the baffle plate 10 may be placed at different levels above the combustion chamber outlet, as shown in Fig. 1, by selectively inserting said plate in the cut-outs C or C', as desired. This alternate arrangement is shown in Figs. 7 and 8.

Although the present discussion of this invention has been limited to the above-described embodiment, other variations thereof are possible without departing from the spirit of the invention. It is therefore not intended that the invention be limited to the particular embodiment disclosed but only to the inventive concept as defined by the appended claims.

What is claimed is:

1. A tripod baffle for oil-fired combustion furnaces, said baffle comprising, in combination: a circular baffle plate having opposed flat faces and an edge that is generally curved but interrupted at angularly spaced intervals by flat surfaces, with the plate being formed on one face with protuberances defined by a surface that is a continuation of one of the flat surfaces on the edge of the plate, and an inwardly inclined surface that extends from the free edge of said edge surface to the surface of the plate on which said protuberances are formed; and a plurality of legs corresponding in number to the protuberances on said plate, each of said legs having a flat side edge formed with a recess that is adapted to snugly receive with an accurate interfit a portion of the plate formed with a protuberance, said recess being defined by a flat surface substantially normal to the edge of the leg, a second flat surface substantially parallel to the edge of the leg and spaced therefrom a distance substantially equal to the extent of a protuberance on the plate, and an inclined surface confronting the first said flat surface, said inclined surface having an angle of inclination substantially the same as the inclined surfaces of the protuberances on the plate whereby the recess has a mouth that is of less extent than the flat surface parallel to the edge of the leg.

2. A tripod baffle for oil-fired combustion furnaces, said baffle comprising, in combination: a circular baffle plate having opposed flat faces and an edge having a curvature determined by the diameter of the plate, said curved edge being interrupted at angularly spaced intervals substantially 120° apart by three flat edge surfaces, one face of the plate being formed with three protuberances at each flat edge surface, each of said protuberances being defined by a flat surface that is a continuation of the flat edge surface of the plate, and an inwardly inclined surface that extends from the free edge of the flat surface of the protuberance to the face of the plate, and three legs, each having an edge surface formed with a recess shaped to snugly receive with an accurate interfit a portion of the plate formed with a protuberance thereon.

3. A tripod baffle for oil-fired combustion furnaces, said baffle comprising, in combination: a circular baffle plate having a top face, a bottom face, and an edge surface with a curvature determined by the diameter of the circular plate which is interrupted at angularly spaced intervals by flat edge surfaces, the bottom face of said plate being formed with protuberances at each of the flat edge surfaces of the plate, each protuberance being defined by a flat edge surface that is a continuation of the flat edge surface of the plate, and an inwardly inclined surface that extends from the free edge of the flat edge surface of the protuberance to said bottom face; and a plurality of legs corresponding in number to the protuberances on said plate, each of said legs having a flat side edge formed with a recess accurately receiving a portion of the plate formed with a protuberance, each of said recesses being defined by a flat top surface that engages the top face of the plate, an inner flat surface substantially parallel to the flat side edge of the leg and having an extent substantially equal to the flat side edge of the plate together with the flat side edge of a protuberance with which it engages, and an inclined bottom surface engaging the inclined surface on one of said protuberances.

4. A tripod baffle for oil-fired combustion furnaces, said baffle comprising, in combination: a circular baffle plate having opposed flat faces and a side edge, said plate being formed on one face thereof with a plurality of protuberances, with each protuberance having an edge surface constituting a continuation of the edge surface of the plate, and an inwardly inclined surface that extends from the free edge of the edge surface of the protuberance to the face of the plate on which the protuberances are formed; and a plurality of legs corresponding in number to the protuberances on the plate, with each leg having a side edge formed with a recess having a shape corresponding to a portion of the plate with a protuberance thereon, with each recess snugly receiving with an accurate interfit that portion of the plate formed with a protuberance thereon.

References Cited in the file of this patent

UNITED STATES PATENTS

| | | |
|---|---|---|
| 1,806,858 | Livingston | May 26, 1931 |
| 1,879,087 | Chomik | Sept. 27, 1932 |
| 2,010,342 | Woods | Aug. 6, 1935 |
| 2,140,125 | Bauer | Dec. 13, 1938 |
| 2,192,752 | Miller | Mar. 5, 1940 |
| 2,262,153 | Wykes | Nov. 11, 1941 |